United States Patent Office 3,536,513
Patented Oct. 27, 1970

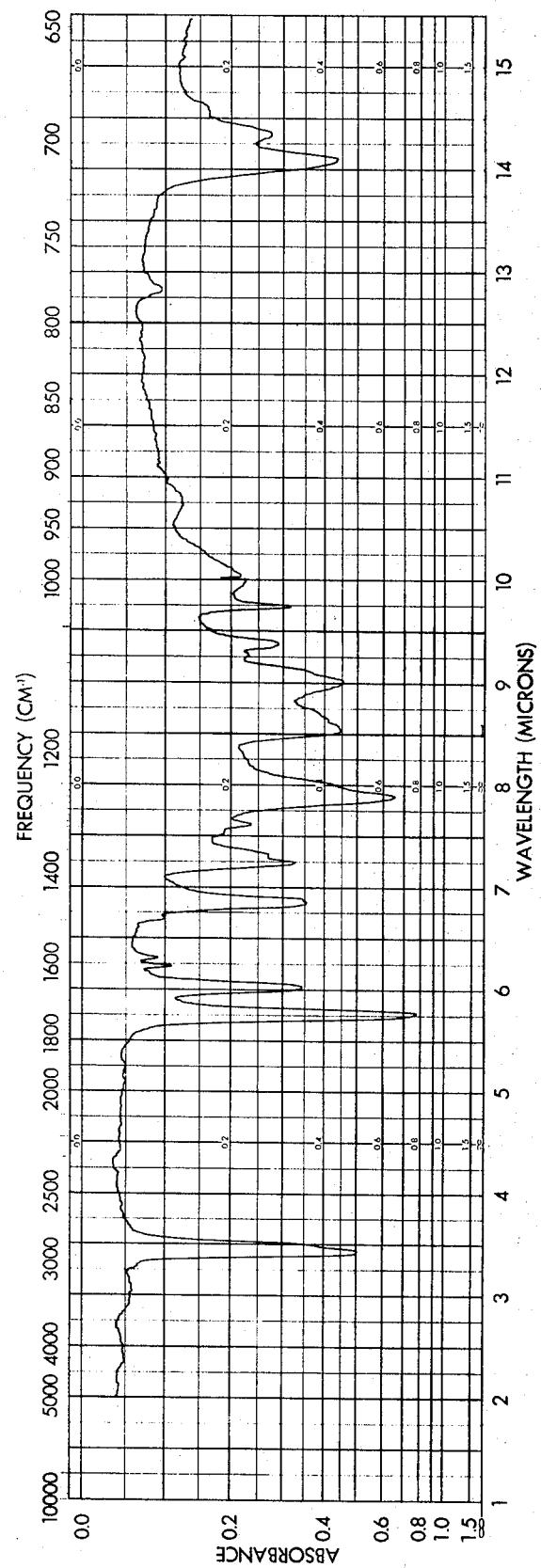

3,536,513
UNIVERSAL COLOR BASE
James A. Arvin, Homewood, and Mary G. Brodie, Chicago, Ill., assignors to The Sherwin-Williams Company, Cleveland, Ohio, a corporation of Ohio
Continuation-in-part of application Ser. No. 611,372, Jan. 24, 1967. This application June 26, 1969, Ser. No. 843,904
Int. Cl. C09d 7/08
U.S. Cl. 106—308     9 Claims

ABSTRACT OF THE DISCLOSURE

There is provided an improved color base useful in imparting color to a wide variety of coating compositions from emulsion types to oil base types characterized by a pigment dispersed in a mixed (aliphatic acid-cyclic acid), oxazoline ester, the precursor of which is a di- or tri-(hydroxy methyl) amino alkane.

RELATED APPLICATION

This application is a continuation-in-part of our copending application Ser. No. 611,372 filed Jan. 24, 1967, now abandoned.

BACKGROUND OF INVENTION AND PRIOR ART

The coatings industry is no less subject to public demand for an ever increasing range of colors than is, for example, the textile industry. The pressure for not only a vast range of standard colors, but also for the ability to match existing colors with other materials, e.g. matching interior decorating coating compositions with drapery materials, has forced the coatings industry into a position of having to maintain large stocks of standard colors as well as the so-called "tube" colors which are adapted to be blended into such standard colors in order to produce a desired share or tint for the purpose of matching or contrasting with some other component of the decorative scheme.

Contemporaneously with this development from the standpoint of public demand, there has been also a drive within the industry toward automatic productiton of coating comositions. The coatings industry, in order to satisfy the needs of its many and varied customers, is called upon to supply coatings not only of many different types of materials, depending upon the nature of the substance, and the conditions to which that substrate is to be exposed, but also many variations within each of the principal categories. For example, in the automotive coatings field, the substrate is usually metallic. This requires a particular type of coating composition. Moreover, automotive products which are to be exposed in the northern part of the country must be able to withstand a wide variation in temperature conditions as well as exposure to ice-controlling chemicals, for example sodium chloride. Likewise in the house painting field, the conditions which obtain in the southern part of the country are quite different from the conditions which obtain in the northern parts of the country, and accordingly variations within the same general class of formulations for outside coating compositions are also required.

In the interior decorating field, the greatest trend has been in the direction of coating compositions which are formulated from latex emulsions since the so-called "water base" coating compositions lend themselves most admirably to use by the homeowner for ease of maintenance of his equipment and ease of handling the coating composition itself. The vehicles in such coating compositions are entirely different from the vehicles which are utilized in, for example, the automotive field, and these in turn are still more widely different from the coating compositions which are used for exterior coating compositions. Innumerable other variations can be illustrated, but the three above mentioned are typical of the many different types of coating compositions and the variations which occur within those types which must be carried by a coatings manufacturer in order to satisfy the broadest scope of demand.

The problem which is inherent in attempting to satisfy the demands of these varied industries as well as the demands of the public for variations in color, not to mention texture, of coating compositions necessitates the maintenance of vast inventories of completed coating compositions. To the accomplishment of the reduction of these inventories, and to the accomplishment of the facilitation of the manufacture of coating compositions of varied vehicle nature, the coatings industry has long sought means for dispersing color into a liquid form which can be measured accurately and which will be compatible with the widest variety of coating compositions.

The present invention provides a solution to this problem in the provision of a unique color base which is compatible with an extremely broad spectrum of coating compositions. It can be seen, therefore, that with the provision of such a class of materials as herein described, the coating manufacturer is provided with a single color system which is compatible with the widest variety of coating compositions which he can manufacture and sell. Not only this, but because of the nature of the vehicles, it is possible to control the extent of addition of the color bases made from such vehicles in a standard coating composition so as to provide the broadest spectrum of colors that the public can demand, and to provide such spectrum with the means for reproducibility.

The class of color bases produced in accordance with the present invention is compatible with coating compositions which are formulated for use as exterior coatings, e.g. outside house paints; with interior decorating coating compositions, for example butadiene-styrene latex base paints; and with lacquers of the type which are useful in coating metallic surfaces, e.g. automotive paints. These are but a few of the classes of coating compositions with which the vehicles of the present invention are compatible and serve only to illustrate the scope of these vehicles and its approach to universality in the coatings industry.

BRIEF DESCRIPTION OF DRAWING

The annexed drawing shows an infrared scan of a preferred vehicle in accordance with this invention.

BRIEF STATEMENT OF INVENTION

Briefly stated, this invention is characterized by the provision of color or shading bases including a mixed ester of a heterocyclic compound which contains an oxazoline ring, the precursor of which is a poly(hydroxy alkyl) amino alkane together with the provision of color or shading bases including an ester of a heterocyclic compound which contains an oxazoline ring, the precursor of which is bis(hydroxy alkyl) amino alkane, especially those which are formed by the treatment of such hydroxy amino compounds with both aliphatic monocarboxylic acid having an iodine value less than 160, and preferably being saturated and branched chain, and a mono-benzenoid ring mono-carboxylic acid, to produce a normally liquid material which is nonpolymeric, and which is nondrying. The alkyl groups contain only one carbon atom and the alkane groups may each contain 1 or 2 carbon atoms. These esters are characterized by the presence therein of a heterocyclic ring containing 5 members herein identified as an "oxazoline ring." These vehicles are particularly useful in the formulation by conventional means of the improved color bases hereof which comprise or consist of the foregoing vehicles of the present invention having dispersed therein from 20 to 1500 parts by weight per 100 parts of vehicle of at least one finely divided pigmentary material, e.g. phthalocyanine blue, cadmium yellow, iron oxide, titanium dioxide, carbon black, zinc chromate, chrome yellow and cadmium sulphide. Any pigment, or combination thereof, nonreactive with the system may be used herein.

DETAILED DESCRIPTION OF INVENTION

As indicated above, the vehicles of the color bases of the present invention are oxazoline esters, the precursors of which are poly(hydroxy methyl) amino compounds containing two or three (hydroxy methyl) groups. Under the conditions of the formation of the esters of the present invention, there is formed an oxazoline ring. Thus, this heterocyclic ring is a characterizing feature of the novel vehicles of the present invention. Additionally, the compounds useful in making the color bases of the present invention are formed by reacting with either a di- or tris-(hydroxy methyl) amino alkane, a relatively high molecular weight aliphatic acid having an iodine number less than 160 in an amount which is less than that which would be required to satisfy all of the amine and hydroxyl functionality of the hydroxyl-amine compound to bring about ring formation to the oxazoline form, and a cyclic mono carboxylic acid or a mixture of polycyclic mono-carboxylic acids to complete the esterification of the available hydroxyls in the hydroxyl-amine compound either sequentially or simultaneously. Where one might expect that materials, such as tris(hydroxy methyl) amino methane and bis(hydroxy alkyl) amino alkane, would have functionalities of four or three, respectively, when they are reacted with a mono-carboxylic acid, one of the things which occurs when such materials are reacted in part with an aliphatic carboxylic acid is ring formation whereby an oxazoline ring is formed. In such ring formation, the functionality due to the amine group and one of the functionalities due to the presence of hydroxyl groups are utilized in the reaction of the hydroxy amino compound with only one mole of a monocarboxylic acid. In a preferred embodiment, reaction of the tris(hydroxy methyl) amino alkane compound with an aliphatic carboxylic acid of the straight chain or branched chain type is carried out to the extent of not more than two of the available functionalities, e.g. amine and one hydroxyl. The balance of the functional content of the precursor compound is then satisfied with a cyclic acid, preferably either a mono-carboxylic aromatic acid, or poly-cyclic acids of the type found in a rosin acid containing 22% of dehydroabietic acid which contains one aromatic ring. When tris(hydroxy methyl) amino methane (Tris Amino) is the precursor, a resulting composition then is usually a mixture of mixed aliphatic-cyclic (acid) oxazoline esters. In this case, and in the cases of other tris(hydroxy methyl) amino alkanes, the amount of the aliphatic acid used generally ranges from 0.8 mol to 2.2 mols of such aliphatic carboxylic acid to 1 mol of the tris(hydroxy methyl) amino alkane. The amount of the cyclic carboxylic acid usually ranges, therefore, from 2.2 to 0.8 mol of such acid to each mol of the tris(hydroxy methyl) amino alkane, the amount of the cyclic acid or cyclic acids in combination with the aliphatic acid being that which is sufficient to balance stoichiometrically the amine and hydroxyl content of the hydroxyl alkyl amino alcohol which is used, or just slightly less.

When a bis(hydroxy alkyl) amino alkane such as 2-amino-2-methyl-1,3-propane diol (AMPD) is the (hydroxy alkyl) amino compound, the amount, therefore, of the aliphatic acid generally ranges from 0.8 to 1.2 mol of such aliphatic carboxylic acids to 1 mol of the bis(hydroxy alkyl) amino compound. The amount of the cyclic carboxylic acid or cyclic carboxylic acids usually ranges, therefore, from 1.2 to 0.8 mol of such acids to each mol of bis(hydroxy alkyl) compound, the amount of the cyclic acid in combination with the aliphatic acid being that which is sufficient to balance stoichiometrically the amine and hydroxyl content of the amino alcohol which is used, or just slightly less.

It becomes convenient at this point to identify still further the natures of the poly(hydroxy alkyl) amino alkane useful as precursors in accordance with this invention, the aliphatic carboxylic acid, and the cyclic acid, respectively.

As indicated above, the principal building block of the present condensation products is a poly(hydroxy methyl) amino alkane. These materials upon initial reaction with a carboxylic acid readily form a heterocyclic oxazoline ring. Thus, particularly suitable materials for use as the amine and hydroxyl providing portions of the oxazoline-containing esters of this invention include tris(hydroxy methyl) amino methane; tris(hydroxy methyl) amino ethane; bis(hydroxy methyl) amino ethane; 2-amino-2-methyl-1,3-propane diol; and the like. The preferred material is the tris(hydroxy methyl) amino methane.

The aliphatic acids useful in accordance with the present invention are preferably saturated branched chain, or they may be saturated straight chain. Best results are secured in respect of compatibility with coating compositions of the types above-mentioned when the aliphatic acid is a saturated mono-carboxylic aliphatic acid characterized by branching in the chain. The aliphatic acids useful in accordance herewith may contain from 5 to 18 carbon atoms, the preferred aliphatic acids containing from 8 to 12 carbon atoms. These acids are not oridinarily obtainable as pure materials, and consequently commercial aliphatic acids are used in accordance herewith which commercial acids constitute or comprise mixtures of aliphatic acids containing, for example, from 8 to 10 carbon atoms. As indicated with the commercial mixtures, compounded mixtures of the foregoing aliphatic acids may be employed.

The cyclic acids useful in accordance herewith are preferably either aromatic monocyclic mono-carboyxlic acids, or the mixtures of polycyclic acids found in rosin. Thus, benzoic acid and substituted benzoic acids, e.g. toluic acids, i.e. 2-methyl benzoic acid, 3-methyl benzoic acid, 4-methyl benzoic acid, xylic acids, i.e. hemellitic acid, 2,5-dimethyl benzoic acid, 2,6-dimethyl benzoic acid, o-methoxy benzoic acid, m-methoxy benzoic acid, 2-ethyl benzoic acid, p-ter.-butyl benzoic acid, p-chlorobenzoic acid, trimethyl benzoic acids, and other alkyl substituted benzoic acids, or alkoxy benzoic acid, or halogen substituted benzoic acids, per se, or natural or synthetic mixtures of acids, e.g. rosin acids, which are natural mixtures of polycarboxylic acids which in some cases contain low percentages of an aromatic acid.

The following description, utilizing "Tris Amino" [tris(hydroxy methyl) amino methane] as an example of a preferred starting material, will illustrate theoretical and practical aspects of this invention, it being understood that other amino compounds could be used in a corresponding manner to produce corresponding base vehicle materials.

In the preparation of these Tris Amino condensates for the universal pigment base vehicle, a mixture of aliphatic and cyclic mono-carboxylic acids has been used. The aliphatic acids have included straight and branched chain acids. The cyclic acids have been limited to benzoic, substituted benzoic and rosin acids. All of these acids are listed below with descriptive data.

TABLE I.—ACID COMPONENTS—TRIS AMINO CONDENSATES

| Acid | Molecular weight | Description |
|---|---|---|
| Straight chain: | | |
| Stearic | 284.47 | $C_{18}$ straight chain saturated acid. |
| Pelargonic acid | 158 | $C_9$ straight chain acid (nonanoic). |
| Valeric | 102 | $C_5$ straight chain acid (pentanoic). |
| Branched chain, primary: | | |
| Isodecanoic acid | 172.27 | Dimethyl octanoic, trimethyl heptanoic. |
| Isooctanoic acid | 144 | Mixture of isomeric branched chain acids with eight carbon atoms. |
| Isononanoic acid | 158 | 90% 3,5,5-trimethyl hexanoic acid; 10% mixture of isomeric branched 9 carbon atom acids. |
| ICI 8–10 acid | 156 | Trimethyl hexanoic. |
| Secondary: | | |
| 2-ethyl hexoic acid | 144.22 | |
| Tertiary: | | |
| Versatic 9–11 acid | 184 187 | Mixture of saturated mainly tertiary monocarboxylic acids having a $C_9$, $C_{10}$, $C_{11}$ chain length. |
| Small proportion of tertiary acids are cyclic, principally pentane ring cyclics: | | $R_2-\overset{\overset{R_1}{\mid}}{\underset{\underset{R_3}{\mid}}{C}}-COOH$ One R group=$CH_3$; All R groups-straight chain. 10% secondary acid; 90% tertiary. |
| Neopentanoic | | 99% trimethylacetic acid (pivalic). |
| Neoheptanoic acid | 102.04 | 90% 2,2-dimethylpentanoic; 10% 2-ethyl, 2-methyl butanoic. |
| Neodecanoic acid | 130.21 | 2,2-dimethyl octanoic 25%; 2-methyl or alkyl octanoic 60%; 2,2-dialkyl octanoic 15%. |
| Neotridecanoic acid | | Substitution similar to neodecanoic but based on a $C_{11}$ chain. |
| Aromatic acids: | | |
| Benzoic acid | 122.12 | |
| Para tertiary butyl benzoic acid | 178.23 | |
| Rosin acids | [1] 350 | Acidic resin (A.V. 160). |

[1] Typical analysis: Abietic acid—18%; Dehydroabietic acid—22%; Dihydroabietic acid—46%; Tetrahydroabietic acid—46%.

PROCESSING PROCEDURES

Actual processing of these condensates has involved several variations which may or may not affect their performance. A limited few have been essentially fusion processed but the greater number have been solvent processed.

Solvents used have been mainly toluene and xylene. Solvent concentration has ranged from 2% to 10%. It has been added in various increments controlled to a large degree by the rate of the water liberated. The reflux can become too vigorous when a large amount of solvent is present at a point when substantial amounts of water are being liberated. As high as 10% has been charged, but this is not always feasible. An initial charge of 3%, with the rest added as reflux permits, works well.

Acids have been added in three different ways including (1) initial charge of both aliphatic and cyclic acid, (2) prereaction of the aliphatic acid component, and (3) prereaction of the cyclic acid component. The procedure would affect the acid substituent directly attached to the oxazoline ring.

Reactions were monitored by amount of water evolved, and acid value to determine extent of reaction. Some difficulties were encountered on occasion in achieving the desired acid value. The acid value difficulty could result from (1) inconsistency in the acid value of the acid; (2) small weight errors; (3) loss of tris amino or tris amino derivative; and (4) sluggishness of reaction in later stages possibly due to steric hindrance.

A final acid value of 10 is acceptable for most purposes, but water systems may more desirably use a product with an acid value less than 5. Consequently, some condensates were formulated with a deficiency of acid and an excess of hydroxyl to achieve this lower value. This is exemplified later.

The three procedures for processing are described below. They are applicable for both fusion and solvent processing.

(I) The acids are charged to a reaction vessel with agitation, heating source, inert gas inlet, thermometer, condenser, and water trap. After heating to 225° F., the tris amino is added. Solvent (3%–10%) is charged as water reflux will permit. Usually an increment of 3% can be added initially although all 10% has been added. A nitrogen blanket is used as well as solvent. The batch is heated gradually to 395° to 420° F. and held for an acid value of 10 or less. Solvent is removed by blowing and the batch is removed. (See Example 11 in Table II.) Top temperature was 397° F. Final acid value was less than 5 because it is an Example 10 type based on a deficiency of acid and an excess of hydroxyl.

(II) The same equipment as above described would be used. In this case the aliphatic acid would be charged, heated to 225° F. and the tris amino added. A nitrogen blanket is used as well as solvent. Three to 10% toluene or xylene can be used as reflux solvent. There have been indications of faster reaction at the 10% level of xylene. Oxazoline ring formation is faster in the presence of higher boiling solvents such as xylene because the temperature can be brought to a higher level. The temperature in the first stage has varied from 350° to 420° F. based on solvent used and water liberated. However, based on reaction rate and the boiling points of the components, a range of 380° to 400° F. is preferable.

After the reaction of the first state has progressed to an acid value of 0 to 5, the cyclic acid is added and the reaction continued at temperatures of 390° to 425° F. to an acid value of less than 10, and in some cases less than 5. (See Examples 9 and 10.)

The specific compositions and procedures delineating these condensates are given below. These examples also show the use of excess hydroxyl with an acid deficiency to achieve the lower acid value condensate. The example numbers refer to an accompanying table where properties are given for a varied group of condensates. These are preferred examples.

Tris amino isodecanoate benzoate (no excess hydroxyl):
 Tris amino (363 g.)—3 moles
 Isodecanoic acid (1,038 g.)—6 moles
 Benzoic acid (366 g.)—3 moles Charge isodecanoic acid into a flask equipped with agitator, condenser, water trap and inert gas. Maintain an inert gas blanket throughout. Heat to 225° F. Add tris amino. Add 5% toluene for reflux. Heat to 350° F. and hold for an acid value of 0–2. Cut heat. Add benzoic acid. Heat to 350° F., then raise temperature to 390°–395° F. Hold to an acid value less than 10. (See Example 9 in Table II.)

Tris amino isodecanoate benzoate (excess hydroxyl):
Tris amino (665 g.)—5.5 moles
Isodecanoic acid (1,903 g.)—11 moles
Benzoic acid (611 g.)—5.01 moles Charge isodecanoic acid into a flask equipped with agitator, condenser, water trap and inert gas. Maintain inert gas blanket. Heat to 225° F. Add Tris Amino and 5% toluene for reflux. Heat to 350° F. and hold for an acid value of 0–5. Cut heat. Add benzoic acid. Heat to 350° F., initially, then raise temperature to 390° to 395° F. In the later stages, use a nitrogen blow to implement removal of water. Hold for an acid value of less than 5. (See Example 10 in Table II.)

Both condensates could also be made by charging all ingredients initially and heating gradually to 350° F. and then to 390° to 395° F. and holding for final acid value.

(III) The procedure would be the same as (II) except the cyclic acid would be charged first and the reaction continued as above. (See Examples 16 and 17.)

As previously explained, Tris Amino will react with three moles of acid. The acid ratios thus have ranged from 3 moles of aliphatic acid to 3 moles of aromatic acid. The latter (tribenzoate) was not practical since it was a solid. The most interesting properties seem to result between the 1.5/1.5 and the 2/1 aliphatic to aromatic acid ratio. In the accompanying tables the various molar compositions and acid variations have been delineated. The end product is probably not a single com-

TABLE II

| Ex. No. | Group No. | Aliphatic acid | Aromatic acid | Acid ratio | OH/COOH | Modified | Process Stage 1 | Process Stage 2 | Reflux cooking time | Cooking temp. °F. Stage 1 | Cooking temp. °F. Stage 2 | Percent theoretical H₂O | Percent Oxazoline ring | Acid value | Percent solids | G-H color | Viscosity G-H |
|---|---|---|---|---|---|---|---|---|---|---|---|---|---|---|---|---|---|
| 1 | I | n-Nonanoic | Benzoic | 1.8/1 | 1.073 | | 5% toluene gradually | | 24:40 | 300–363 | 380–390 | 85.1 | 39.8 | 1.1 | 98.9 | 9–10 | G– |
| 2 | I | Isodecanoic | Rosin acids | 2/1 | 1.000 | | 4.2% toluene | | 20:05 | 300–360 | 392 | 91.4 | 67.0 | 9.2 | 94.3 | 18 | Z₆++ |
| 3 | II | Versalic | do | 1/2 | 1.000 | | 5% toluene | | 28:20 | 350–360 | 396–400 | 93.2 | 75.0 | 10.5 | 93.2 | | |
| 4 | III | Isodecanoic | Benzoic | 2.5/0.5 | 1.000 | | Fusion | | 42:50 | 300–360 | 390–395 | 94.3 | 74.7 | 4.6 | 96.7 | 8 | J |
| 5 | III | do | do | 2/1 | 1.000 | | 1.4% toluene | 1.4% toluene | 19:00 | 300–350 | 360–425 | 99.5 | 96.3 | 8.8 | 90.4 | 10 | P– |
| 6 | III | do | do | 1.5/1.5 | 1.000 | | 6.9% toluene gradually | | 38:00 | 300–160 | 392 | 99.2 | 98.1 | 4.5 | 98.1 | 13–14 | X |
| 7 | III | do | do | 1/2 | 1.000 | | 5.0% toluene gradually | | 19:25 | 300–357 | 360–398 | 93.2 | 73.2 | 0.9 | 96.2 | 16 | Z₄ |
| 8 | III | do | PTBBA¹ | 2/1 | 1.000 | | 5.0% toluene gradually | | 28:20 | 300–350 | 350–390 | 92.8 | 71.8 | 10.5 | 96.2 | 13 | Z₁ |
| 9 | III | do | Benzoic | 2/1 | 1.000 | | 1.4% toluene | 1.4% toluene | 19:00 | 300–350 | 360–425 | 99.5 | 96.3 | 8.8 | 90.4 | 10 | P– |
| 10 | IV | do | do | 2/0.91 | 1.031 | | 5% toluene gradually | | 24:20 | 300–350 | 350–402 | 94.3 | 76.8 | 2.8 | 93.1 | 12 | R |
| 11 | IV | do | do | 2/0.91 | 1.031 | One stage | 5% toluene gradually | | 21:05 | 300–307 | 350–300 | 93.5 | 72.3 | 3.9 | 98.1 | 12 | S– |
| 12 | IV | do | do | 1.83/0.92 | 1.091 | | 5% toluene gradually | | 30:15 | 300–357 | 350–405 | 94.7 | 74.7 | 3.1 | 97.9 | 11+ | T |
| 13 | IV | do | do | 1.88 | 1.088 | | 5% toluene gradually | | 30:45 | 300–354 | 315–405 | 94.3 | 80.2 | 0.7 | 98.2 | 14 | U |
| 14 | V | do | do | 2/0.91 | 1.031 | | 5% toluene gradually | | 24:20 | 300–380 | 350–402 | 94.3 | 76.8 | 2.8 | 93.1 | 12 | R |
| 15 | V | do | do | 2/0.91 | 1.031 | One stage | 5% toluene | | 21:05 | 300–307 | | 93.5 | 72.3 | 3.9 | 98.9 | 12 | S– |
| 16 | V | do | do | 2/0.91 | 1.031 | Benzene first | 5% toluene gradually | | 29:40 | 300–377 | 350–395 | 89.4 | 10.0 | 46.0 | 86.1 | 18+ | V |
| 17 | V | do | do | 2/0.91 | 1.031 | do | 5% toluene gradually | | 27:45 | 300–356 | 350–440 | 65.5 | None | 19.9 | 94.7 | 18+ | T |
| 18 | VI | Isononanoic | do | 1.5/1.5 | 1.000 | | 3% xylene | 3% xylene | 11:35 | 300–419 | 364–410 | 94.6 | 84.6 | 7.4 | 89.9 | 13–14 | S |
| 19 | VI | do | do | 1.5/1.5 | 1.000 | | 10% xylene initially | | 22:05 | 280–372 | 340–410 | 92.2 | 81.7 | 16.5 | 90.7 | 12–13 | O |
| 20 | VI | do | do | 1.5/1.5 | 1.000 | Benzene first | 3% xylene | | 14:30 | 300–406 | 320–420 | 76.9 | 40.5 | 9.6 | 96.5 | 14–15 | Z₄+ |
| 21 | VII | do | do | 2/1 | 1.000 | | 3% xylene | 3% xylene | 10:00 | 300–400 | 333–420 | 96.4 | 85.7 | 8.7 | 90.2 | 4–5 | J |
| 22 | VII | do | do | 1.75/1.25 | 1.000 | | 3% xylene | 3% xylene | 12:33 | 300–414 | 358–416 | 98.8 | 95.1 | 10.2 | 94.0 | 11 | V |
| 23 | VII | do | do | 1.75/1.25 | 1.013 | | 3% xylene | 3% xylene | 11:50 | 300–418 | 332–398 | 97.2 | 89.5 | 8.1 | 88.8 | 13–14 | S |
| 24 | VII | do | do | 1.5/1.5 | 1.000 | | 3% xylene | 3% xylene | 11:35 | 300–419 | 364–410 | 94.6 | 84.6 | 7.4 | 89.9 | 4 | O |
| 25 | VII | do | do | 1.5/1.5 | 1.000 | | 3% xylene | 3% xylene | 13:05 | 300–390 | 340–420 | 95.0 | 80.2 | 7.2 | 88.5 | 9–10 | H |
| 26 | VIII | do | do | 1.75/1.25 | 1.000 | | 3% xylene | 3% xylene | 11:35 | 328–410 | 350–420 | 97.7 | 91.6 | 7.4 | 95.1 | 11 | R |
| 27 | VIII | do | do | 1.75/1.5 | 1.086 | | 3% xylene | 3% xylene | 8:00 | 327–410 | 354–410 | 96.5 | 87.0 | 6.7 | 89.0 | 7 | L |
| 28 | VIII | do | do | 1.5/1.5 | 1.000 | | 3% xylene | 3% xylene | 27:40 | 326–398 | 336–480 | 82.3 | 35.0 | 7.5 | 94.9 | 18–18 | W |
| 29 | VIII | do | do | 1.5/1.5 | 1.000 | | 3% xylene | 3% xylene | 20:20 | 320–410 | 325–420 | 85.1 | 48.6 | 10.1 | 96.5 | 12 | X+ |
| 30 | IX | 2-Ethylhexoic | do | 2/1 | 1.000 | | 10% xylene gradually | | 17:00 | 300–406 | 400–410 | 94.4 | 85.2 | 8.6 | 94.8 | 13 | D–E |
| 31 | IX | do | do | 1.5/1.5 | 1.002 | | 10% xylene initially | | 24:00 | 350–420 | 366–420 | 97.0 | 88.4 | 10.4 | 87.4 | 18+ | N |
| 32 | IX | do | do | 1.497/1.497 | 1.028 | | 10% xylene gradually | | 15:00 | 340–420 | 364–420 | 97.5 | 88.6 | 7.0 | 92.5 | 18++ | R |
| 33 | IX | do | do | 1.455/1.455 | 1.028 | | 10% xylene gradually | | 17:45 | 316–388 | 364–424 | 99.9 | 99.1 | 4.9 | 98.3 | 18++ | M |
| 34 | IX | do | do | 1.456/1.411 | 1.046 | | 10% xylene gradually | | 23:50 | 290–365 | 360–415 | 98.7 | 95.0 | 7.2 | 98.5 | 13 | G |
| 35 | IX | do | do | 1.94/0.97 | 1.031 | | 10% xylene gradually | | 34:00 | 324–423 | 336–420 | 94.4 | 78.5 | 3.0 | 88.3 | 17–18 | G |
| 36 | IX | do | do | 0.97/1.94 | 1.031 | | 10% xylene gradually | | 30:00 | 314–406 | 346–420 | 95.7 | 83.2 | 6.5 | 91.8 | 18+ | M |
| 37 | X | do | PTBBA¹ | 2/0.91 | 1.031 | | 6% xylene | | 32:50 | 328–390 | 364–410 | 97.5 | 98.6 | 18.0 | 83.9 | 16 | G |
| 38 | XI | Isodecanoic | Benzoic | 1/1 | 1.000 | AMPD² | Toluene | | 12:00 | 320–334 | 332–400 | 96.2 | 96.2 | 9.6 | 41.3 | 9 | G |

¹ PTBBA = Para-tert.-butyl benzoic acid.
² AMPD = 2-amino-2-methyl-1,3-propane diol.

position, but a family of products. In a mixture of isodecanoic and benzoic acid the product could contain the triisodecanoate, the diisodecanoate-monobenzoate and the monoisodecanoate-dibenzoate providing transfer reactions are limited. This would apply under Process II. If Process I or III were used, the tribenzoate might also be present.

Of the aliphatic acids the branched chain type have been the most successful. It is difficult to state that the position of the branch is critical when considering the differences between versatic acid and isodecanoic or isononanoic acid, since all three have been successful. Perhaps it is primarily the branched character per se which is most important.

Table II

Group I presents the straight chain fatty acid-aromatic acid condensates prepared. Cooking times include both reactions. Characteristics are for the final products.

Group II gives the isodecanoic and Versatic-rosin acid condensates.

Group III presents the various molar ratios of isodecanoic to benzoic acid and an isodecanoic para-tert. butyl benzoic acid (PTBBA) condensate.

Group IV presents the various OH/COOH ratios studied in the isodecanoic-benzoic condensate.

Group V presents the process variations tried with the excess OH type. These include initial charge of all ingredients (Example 15) and prereaction of the aromatic acid (Examples 16 and 17). The latter indicates less satisfactory oxazoline ring formation.

Group VI delineates the prereaction of isononanoic acid versus prereaction of benzoic acid. Again oxazoline ring appears lower. Example 19 was a repeat of Example 18 in which the AV did not drop as desired. The residual hydroxyl again was essentially close to zero. It is presented because the isononanoic was the same sample used in Example 20. However, it was a 5-gal. batch versus a flask for Example 20.

Groups VII and VIII present the respective isononanoic and isooctanoic-benzoic condensates. Example 29 is a repeat of Example 28 whose temperature hit 480° F. It appears that the isooctanoic-benzoic condensate at the 1.5/1.5 ratio yields a lower oxazoline ring content.

Group IX gives the various ratios of 2-ethylhexoic to benzoic acid studied. Hydroxyl excesses were used because of some difficulty in completing reaction. 2-ethylhexoic is a secondary acid.

Group X treats the same 2-ethylhexoic with PTBBA. A tendency to crystallization at 1.5 and 2/1 ratios of PTBBA was noted in examples not reported in Table II. Again, hydroxyl excess was used.

Group XI represents the preparation of condensates from 2-amino-2-methyl-1,3-propanediol.

Table Notes

OH/COOH—Total ratio of amine and hydroxyl in Tris Amino to carboxyls in acids.
Modifications—i.e., process or composition. Ex.: One Stage—Reactants all charged initially; Benzoic First— indicates prereaction of benzoic acid in the first stage rather than the aliphatic acid (Process III).
Process—Fusion or solvent or combination. Solvent addition noted for stage where possible. In some cases addition may be gradual throughout. Arrows indicate continuous presence of solvent charged in first stage.
Reflux Cook Time—Represents approximate time within the range of cook temperatures used; heatup times excluded.
Percent theoretical $H_2O$—Represents the percent of water removed versus that theoretically possible. This may vary slightly due to calculation basis, namely (1) total theoretical water or that at this (2) particular acid value. Except where the acid value is high, the difference is not significant.
Percent oxazoline Ring—Calculated based on final acid value, water removed, and yield solids or approximate yield (charge water removed).

The annexed drawing exemplifies an infrared scan of a nondrying, isodecanoic-benzoic mixed ester of tris(hydroxy methyl) amino methane in which the molar ratio of isodecanoic:benzoic:amino alcohol is 2:1:1, a preferred product in accordance herewith (Example 9 of Table II). As indicated, these vehicles are nondrying and, quite importantly, exhibit no substantial adverse effects on the drying of the coating composition vehicles, inclusive of drying oil, or oil modified resins, lacquers, enamels, or emulsion type vehicles, e.g. synthetic rubber latices, with which they may be used. Also, these vehicles exhibit no adverse effects on the pigment or pigments dispersed therein, and possess great stability, which is important in respect of the shelf-life of color bases made from such vehicles.

In summary, then, the vehicles of the present invention are preferably produced by first interacting a $C_4$–$C_{18}$ aliphatic monocarboxylic acid, which is preferably saturated and branched, with the amino alcohol, and the acid value carried to about 5. From 1 to 2.5 moles of aliphatic acid per mole of amino alcohol (tris amino compound) are used. Thereafter, the cyclic acid, if it is an aromatic acid is preferably monocyclic and monocarboxylic. However, in the case of rosin acids they are polycyclic and monocarboxylic. The cyclic acid or acids are added and the cooking continued until the final acid value is reached. This is usually in the range of from 1 to 10. From 0.5 to 1 or 2 moles of cyclic acid per mole of amino alcohol are used depending on the functionality, and the total of aliphatic and cyclic acid being equal to or slightly less than stoichiometric. When the carboxylic acids are blended prior to reaction with the amino alcohol, the resulting structure is somewhat uncertain.

The amount of combined aliphatic acid and cyclic acid, whether sequentially or simultaneously reacted with the amino alcohol, is desirably either a stoichiometric ratio or slightly less.

In conducting the esterification reaction, from 0.01% to 1.0% of a catalyst may be employed, although preferably not until after ring formation has occurred. Suitable catalysts include triphenyl phosphite and lithium carbonate. With some catalysts, color formation tends to be a problem and, therefore, it is desirable to carry out these reactions over the somewhat prolonged period of from 7 to 50 hours necessary to obtain the desired acid value in the absence of a catalyst. No color difficulty was experienced with triphenyl phosphite, however. Also, this catalyst may be added at the beginning of the first stage. It has been found that the presence of solvent such as aromatic hydrocarbon tends to promote oxazoline ring formation, a desired and characterizing feature of the esters of this invention. From 1% to 10% by weight of the esterification mixture of solvent is added as early as possible in the reaction. Specific aromatic hydrocarbon solvents include benzene, toluene and xylene. The solvent may be added prior to reaction, or initially, or it may be added gradually in the course of the esterification.

The reaction is usually carried out in two stages, in the first of which the temperature is gradually increased to a maximum from about 375° to 420° F., preferably 375° to 400° F. Following the addition of the second acid, the temperature is increased, usually to a range of 390° F. to 425° F., where the reaction is maintained till an acid value of 10 or below, preferably below 5, is reached. Higher temperatures may be used in the second stage but are generally not considered preferable.

The total reaction time may vary from 7 to 50 hours. The time for a given stage of the reaction is determined by arrival at a predetermined acid value or acid value range. The final acid value of the vehicles of this invention is 10 or below, and preferably below 5. Following the addition of the second acid, the temperature may be increased, usually to within a few degrees of 425° F. where the reaction is maintained for a period of time approximately equal in time to stage one, that is, from 7 to 50 hours, and as indicated above, the acid value is generally less than 10. The time for a given stage of the reaction is determined by arrival at a predetermined acid value or within a range of acid values.

At the conclusion of the reaction, any solvent which has been used is desirably stripped off, if this can be done conveniently without impairing the color of the vehicle. Usually from 1% to 10% of the end product constitutes solvent due to difficulty in removing all of the solvent without sacrificing color.

In general, the vehicles of this invention produced in accordance herewith generally have the following characteristics:

Acid value—1–10
Color (Gardner-Holdt) (clear)—4–18
Viscosity (Gardner-Holdt)—D–$Z_6$
Weight per gallon—7.9–9.1 lbs.
Percent solids—82%–99%
Percent oxazoline—60%–100%
Molecular weight—450–503

The following examples illustrate color bases of preferred compositions useful for blending with preformed base coating compositions or for use in forming specific color bases of improved properties:

EXAMPLE CB-1

| | Parts by weight |
|---|---|
| Titanium dioxide | 62.5 |
| Vehicle of Example 9, Table II | 9.0 |

EXAMPLE CB-2

| | |
|---|---|
| Ferrite yellow pigment | 38.0 |
| Vehicle of Example 9, Table II | 3.2 |

EXAMPLE CB-3

| | |
|---|---|
| Medium chrome yellow pigment | 65.0 |
| Vehicle of Example 10, Table II | 5.4 |

EXAMPLE CB-4

| | |
|---|---|
| Copper phthalocyanine (blue) pigment | 20.0 |
| Vehicle of Example 9, Table II | 4.0 |

EXAMPLE CB-5

| | Parts by weight |
|---|---|
| Lampblack | 11.0 |
| Vehicle of Example 9, Table II | 24.0 |

EXAMPLE CB-6

| | |
|---|---|
| Carbon black | 12.5 |
| Vehicle of Example 9, Table II | 20.5 |

As indicated above, these universal color bases are prepared by merely grinding the pigments into the vehicles to a predetermined Hegman grind, for example 7+. The weight ratio of pigment to vehicle is in the range of 0.2:1 to 15:1, and preferably in the range of 0.45:1 to 12:1.

The following examples are formulations of improved properties for mixing color bases which are particularly useful in formulating enamels or lacquers substantially independently of the type of vehicle or binder which characterizes the enamel or lacquer.

EXAMPLE MCB-1

| | Parts by weight |
|---|---|
| Titanium dioxide | 62.5 |
| Vehicle of Example 9, Table II | 9.0 |
| Propylene glycol mono-methyl ether | 21.5 |
| Xylene | 7.0 |

EXAMPLE MCB-2

| | |
|---|---|
| Ferrite yellow | 38.0 |
| Vehicle of Example 9, Table II | 3.2 |
| Propylene glycol mono-methyl ether | 30.8 |
| Xylene | 28.0 |

EXAMPLE MCB-3

| | |
|---|---|
| Medium chrome yellow | 65.0 |
| Vehicle of Example 10, Table II | 5.4 |
| Propylene glycol mono-methyl ether | 23.0 |
| Xylene | 6.6 |

EXAMPLE MCB-4

| | |
|---|---|
| Copper phthalocyanine (blue) pigment | 20.0 |
| Vehicle of Example 9, Table II | 54.0 |
| Propylene glycol mono-methyl ether | 20.0 |
| Xylene | 6.0 |

EXAMPLE MCB-5

| | |
|---|---|
| Lampblack | 11.0 |
| Vehicle of Example 9, Table II | 24.0 |
| Propylene glycol mono-methyl ether | 49.0 |
| Xylene | 16.0 |

EXAMPLE MCB-6

| | |
|---|---|
| Carbon black | 12.5 |
| Vehicle of Example 9, Table II | 20.5 |
| Propylene glycol mono-methyl ether | 50.0 |
| Xylene | 17.0 |

What is claimed is:
1. A color base consisting essentially of an intimate mixture of:
(a) from 20 to 1500 parts be weight of a finely divided solid particulate pigment, and
(b) 100 parts by weight of a normally liquid, mixed aliphatic-cyclic (acid) oxazoline ester, the precursor for which is a poly(hydroxy alkyl) amino alkane and wherein:
(1) the alkyl group contains one carbon atom and the alkane group contains 1 or 2 carbon atoms;
(2) the aliphatic moiety is derived from a saturated aliphatic monocarboxylic acid containing from 5 to 18 carbon atoms; and
(3) the cyclic moiety is derived from a monobenzenoid monocarboxylic aromatic acid, or rosin acids;
the molar ratio of the aliphatic acid to the aromatic acid being in the range of from 2.5:0.5 to 1:2 and the total amount of acid being approximately stoichiometric relative to the amine and hydroxyl contents of the poly(hydroxy alkyl) amino alkane.

2. A color base in accordance with claim 1 wherein the poly(hydroxy alkyl) amino alkane is tris(hydroxy methyl) amino methane.

3. A color base in accordance with claim 1 wherein the poly(hydroxy alkyl) amino alkane is bis(hydroxy methyl) amino ethane.

4. A color base in accordance with claim 1 wherein the aliphatic acid is isononanoic acid.

5. A color base in accordance with claim 1 wherein the cyclic acid is benzoic acid.

6. A color base in accordance with claim 1 wherein the cyclic acid is a substituted benzoic acid.

7. A color base in accordance with claim 1 wherein the cyclic acid is para-tertiary butyl benzoic acid.

8. A color base in accordance with claim 3 wherein the aliphatic acid is isononanoic acid and the cyclic acid is benzoic acid.

9. A color base in accordance with claim 3 wherein the aliphatic acid is a branched chain aliphatic acid.

References Cited

UNITED STATES PATENTS 2,504,951  4/1950  Tryon _____ 260—307.6

JAMES E. POER, Primary Examiner